Aug. 20, 1957  A. L. RAMSEY ET AL  2,803,273
APPARATUS FOR TRIMMING LUMBER AND
CONTROL MEANS THEREFOR
Filed March 28, 1955  3 Sheets-Sheet 1
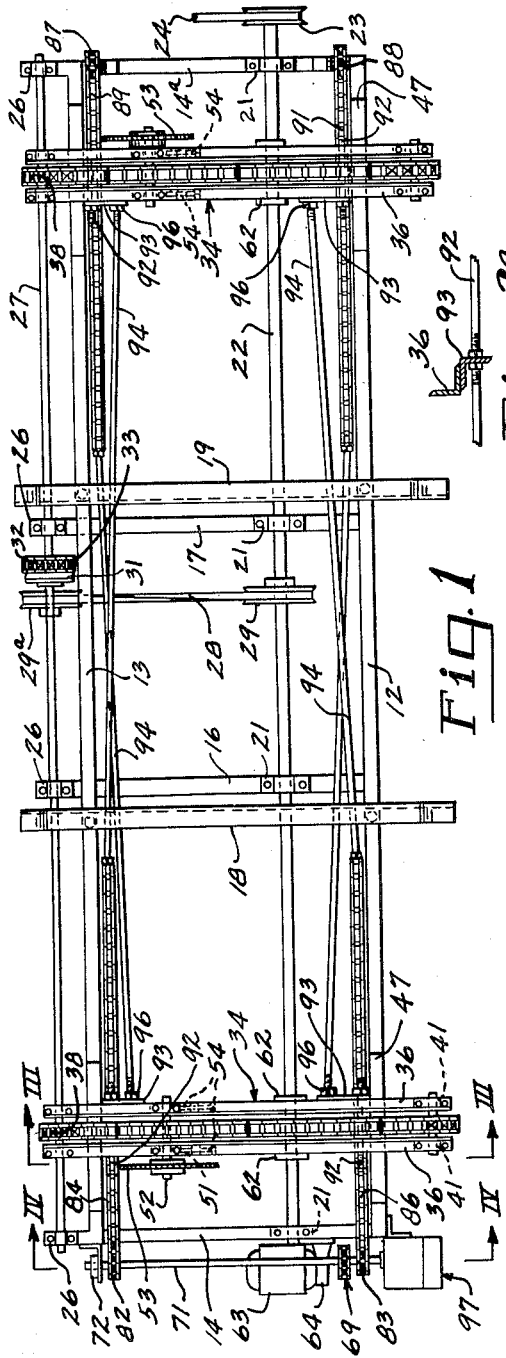
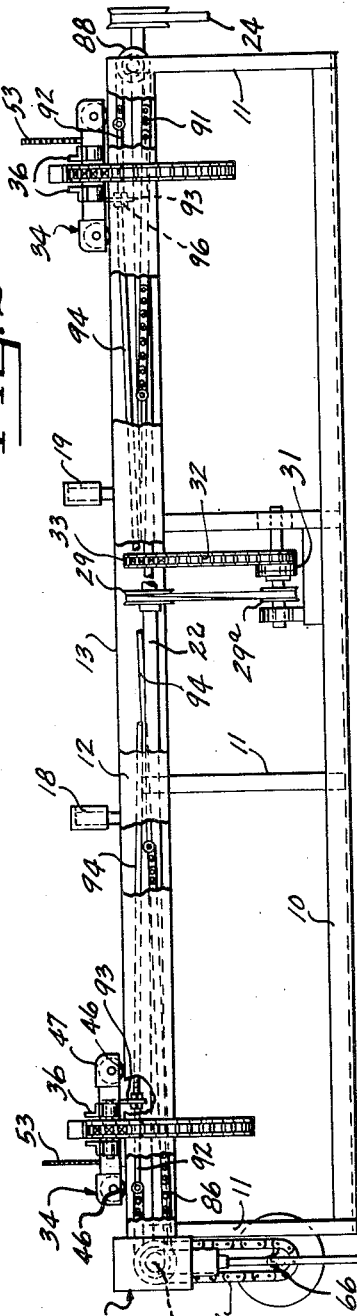
INVENTORS
THOMAS W. WESTBROOK
ALLAN C. McCOLL
BY AUSTIN L. RAMSEY
Jennings & Carter
ATTORNEYS

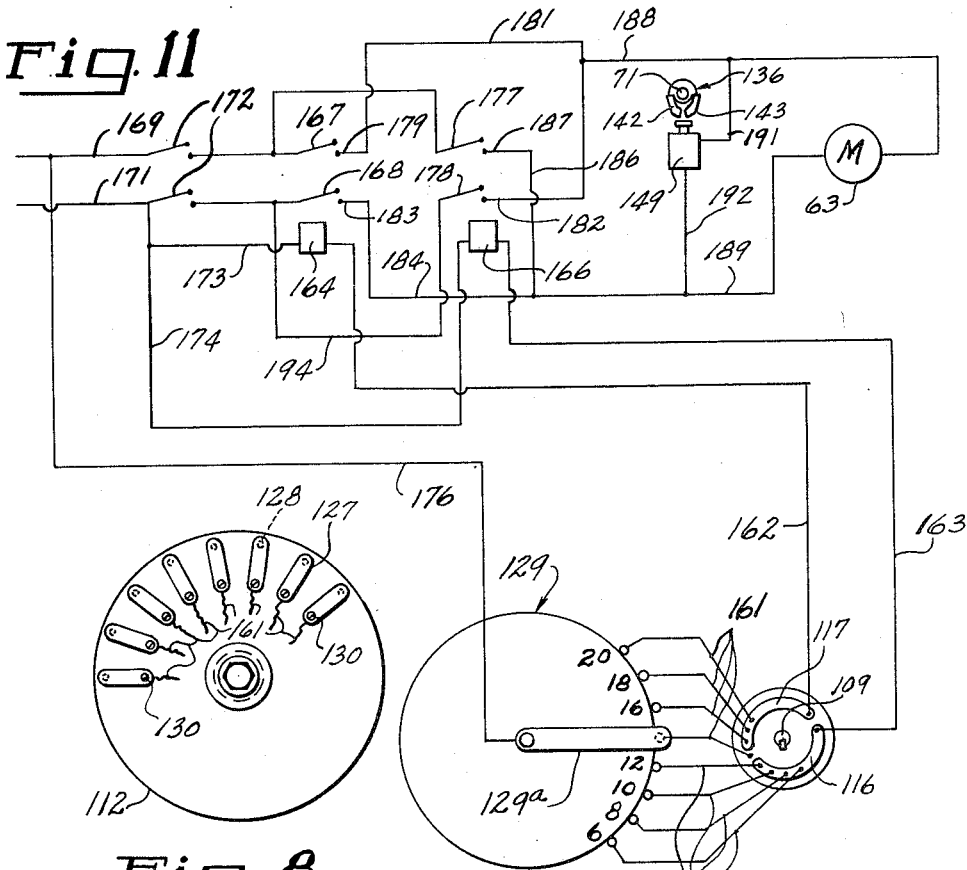
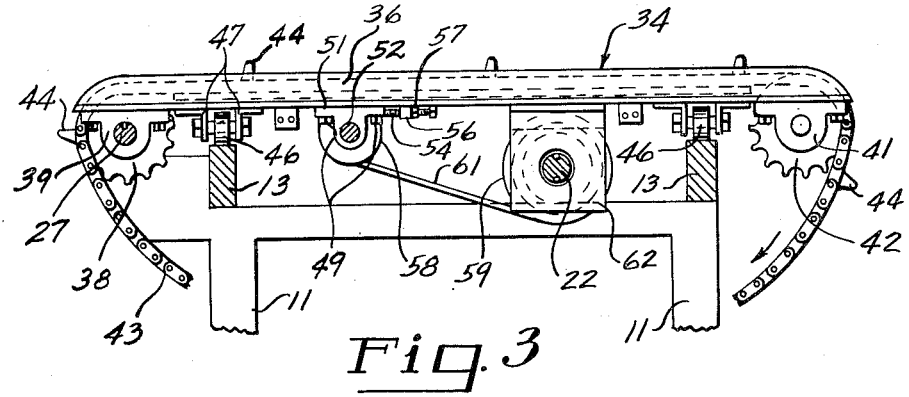
Fig. 11
Fig. 8
Fig. 3
INVENTORS
THOMAS W. WESTBROOK
ALLAN C. McCOLL
BY AUSTIN L. RAMSEY
ATTORNEYS

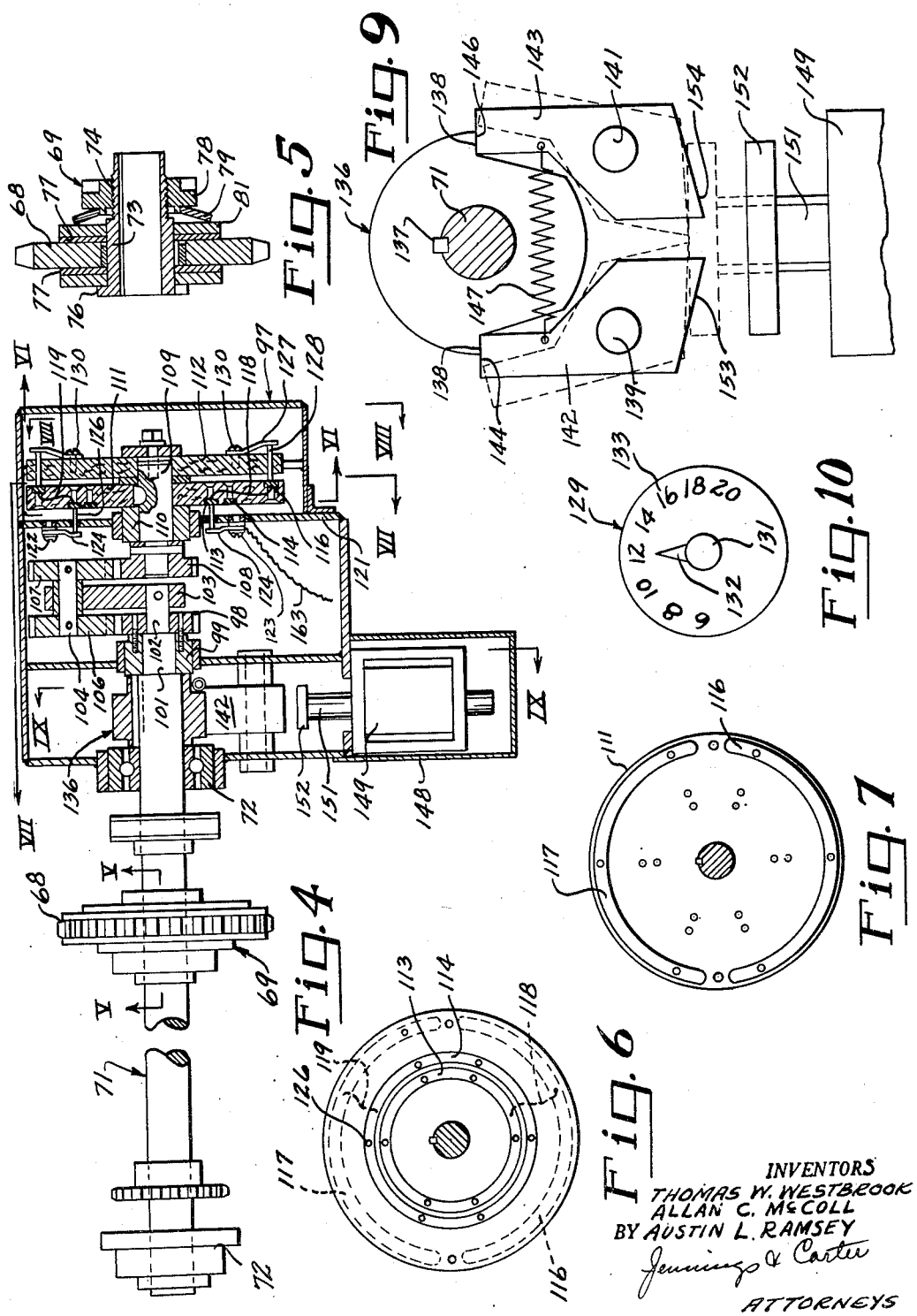

United States Patent Office 2,803,273
Patented Aug. 20, 1957

2,803,273

APPARATUS FOR TRIMMING LUMBER AND CONTROL MEANS THEREFOR

Austin L. Ramsey, Allan C. McColl, and Thomas W. Westbrook, Chattanooga, Tenn., assignors to The Wheland Company, a corporation of Tennessee Application March 28, 1955, Serial No. 497,238

3 Claims. (Cl. 143—37)

This invention relates to apparatus for trimming the ends off lumber and the like for the purpose of cutting the same to an exact, predetermined length, and relates more specifically to a lumber trimmer embodying a pair of saws movable toward and from each other, together with control means operable automatically to position the saws at selected, predetermined distances apart.

Another object is to provide apparatus of the character designated in which the saws are movable toward and from each other by a common power source, and in which the control means is effective to assure that the saws are spaced precisely the predetermined distance apart whereby the lumber cut thereby is of exact, predetermined length.

Another object is to provide control means for such apparatus in which the saws automatically are caused to move into the position for which the control means is set, regardless of the initial position of the saws and regardless of whether the saws must approach each other or move away from each other to reach the new position, all by the setting of a single electric switch or the like.

Another object is to provide a control system for apparatus of the character designated in which the saws are moved to exact spacing by the setting of a position selector means, the system including means for automatically determining the direction that the saws must move to reach the desired spaced position determined by the selector means.

Another object is to provide apparatus of the character designated in which there is mechanical means for assuring that the saws stop their relative movement toward or from each other at exact distances apart, as for example at even foot spacings, which mechanical means is automatically operable upon the initiation of movement of the saws to release the saws for movement toward or from each other whenever the movement to a new position is called for by the selector means.

Another object is to provide a lumber trimmer in which there are movable feed chain guide members or supports and in which the saws are mounted on arbors journalled on the guide members as distinguished from mounting the saws on a long, splined shaft as in prior apparatus, our improved mounting for the saws making it easier to change saws, eliminating the whipping action resulting from mounting a saw on a long, unsupported shaft, and facilitating the adjustment of the saw to obtain "toe-in" of the saws to increase the cutting efficiency thereof.

A further object of our invention is to provide chain guide assembly together with a saw mounted thereon, the chain for feeding the lumber to the saw being driven by a splined shaft which serves also as one of the shafts for slidably holding the chain guide in place on the frame of the apparatus, and in which power for the saw is supplied from a second shaft which serves also as a sliding positioning means for the chain guide.

Briefly, our invention contemplates a lumber trimmer in which there are two chain guide and saw assemblies. The chain guide and saw assemblies are mounted on rollers for movement toward and from each other on a frame. They are guided on the frame by means of two shafts, both of which are driven, and one of which supplies power for the saws and the other of which supplies power to operate the chains of the guides. The saws are mounted on the ends of stub arbors and may readily be removed. The saws preferably are driven by individual V-belts from pulleys which are keyed slidably to the saw power shaft. The chain guides are mechanically tied together through a system of sprocket chains and pull rods, the chains being driven by a cross shaft mounted in the frame of the apparatus. The linkage and connection between the cross shaft and the chain guide and saw assemblies is such that when the shaft is rotated in one direction the saw and chain guide assemblies move toward each other, and when the shaft is rotated in the opposite direction the saw and chain guide assemblies move away from each other, thereby to determine the spacing between the saws. We provide a reversible electric motor to rotate the cross shaft. The control means for the electric motor consists essentially of a manually operable selector electric switch having an indicator dial on which is indicated the lengths of the board to be cut, namely, the spacings between the saws which are desired. Due to the details of the controls presently to be described, when the selector switch is turned to a given setting of the saws the chain guide and saw assemblies move to that position, automatically, regardless of whether previous to the selection just mentioned they were further apart or closer together than called for by the new setting. Therefore, with a single setting of the selector switch we automatically position the saws the correct distance apart to cut a board of predetermined length.

Apparatus illustrating features of our invention is shown in the accompanying drawings forming a part of this application in which:

Fig. 1 is a plan view of a lumber trimmer embodying the features of our invention, certain of the parts being omitted for the sake of clarity;

Fig. 2 is a side elevational view thereof with certain parts broken away and in section;

Fig. 2a is an enlarged detail view showing the method of attaching the pull rods to the chain guide and saw assemblies;

Fig. 3 is an enlarged detail sectional view taken generally along line III—III of Fig. 1;

Fig. 4 is a still further enlarged, detail sectional view taken generally along line IV—IV of Fig. 1;

Fig. 5 is a sectional view through the torque limiting drive device taken generally on line V—V of Fig. 4, the view being slightly enlarged;

Fig. 6 is a detail sectional view taken generally along line VI—VI of Fig. 4;

Fig. 7 is a detail sectional view taken generally along line VII—VII of Fig. 4;

Fig. 8 (sheet 2) is a detail sectional view taken generally along line VIII—VIII of Fig. 4;

Fig. 9 (sheet 3) is an enlarged detail sectional view taken along line IX—IX of Fig. 4;

Fig. 10 is an end elevational view of the manual selector switch taken on line X—X of Fig. 2 and enlarged; and, Fig. 11 (sheet 2) is a wiring diagram.

Referring now to the drawings for a better understanding of our invention our improved lumber trimmer comprises a frame which may consist of base members 10, vertical post members 11 and upper side members 12 and 13. The members 12 and 13 form trackways for the chain guide and saw assemblies as will later appear. The frame also comprises end cross members 14 and 14a and a suitable number of intermediate cross members 16 and 17. Spaced transverse slides 18 and 19 serve as supports for the lumber adjacent its longitudinal center as it is pulled across the apparatus by the chains of the guides as will later appear.

Mounted in suitable bearings 21 on the cross members 14, 14a, 16 and 17, is a splined power shaft 22. The shaft 22 may be provided with a pulley 23 and power may be supplied thereto from any suitable source, not shown, through a belt or the like 24.

Mounted alongside the other side of the frame, in suitable bearings 26 is a splined shaft 27. A belt 28 from a pulley 29 mounted fixedly on shaft 22 drives the input pulley 29a of a clutch arrangement which is shown diagrammatically in the drawings at 31. The shaft 27 is driven by a chain 32 which passes over a sprocket 33 fast on shaft 27.

The machine is provided with two guide chain and saw assemblies which are indicated generally by the numeral 34. In view of the fact that these units are identical a description of one will suffice for both. As best shown in Figs. 1, 2 and 3 of the drawings the assembly consists of angles 36, spaced apart. There are suitable spacers between the angles which serve to support the lumber feed chains as will be described. Splined to the shaft 27, for sliding movement therealong, is a sprocket 38. Depending bearing-like supports 39 are provided on either side of the sprocket 38 whereby the sprocket is slid along the shaft 27 as the carriages move. The supports 39 serves slidably to position the adjacent end of the assembly on the shaft 27. Mounted in suitable bearings 41 on the other end of the assembly 34 is an idler sprocket 42. A feed chain 43 passes over the sprockets and is provided at intervals with attachments 44 for pulling the boards laterally of the apparatus into the saws in a manner well understood for these devices. The assembly is supported on the tracks 12 and 13 by rollers 46. The rollers are mounted in brackets 47 which extend laterally of the assembly 34.

Secured to the underside of the framework of the assembly by bolts 49 and nuts therefor are spaced bearings 51 for a saw arbor 52. Mounted on the arbor is a saw 53. The bearings may be individually adjusted by means of set screws 54 which pass through brackets 56 and which are provided with lock nuts 57. It will thus be seen that by loosening the nuts on the bolts 49 and by adjusting the take up or set screws 54, toe-in of the saw may be obtained.

Fixedly secured to the arbor 52 is a pulley 58. Slidably secured and splined to the shaft 22 is a pulley 59. Passing over the pulleys is a V-belt 61. The pulley 59 is enclosed on either side by means of suitable bearing like members 62 secured to the assemblies so that the pulley 59 moves along the shaft 22 as the assembly moves. The members 62 serve to position the adjacent end of the assembly from shaft 22.

Near one end of the apparatus is a reversible electric motor 63. The motor 63 drives a speed reduction gear box 64 which has a sprocket 66 on the output shaft thereof. Passing over the sprocket 66 is a chain 67. The chain passes upwardly over a sprocket 68 of a torque limiting device indicated generally by the numeral 69. The unit 69 is mounted on a cross shaft 71 in turn mounted in suitable bearings 72 at its ends as best shown in Fig. 4.

The unit 69 is shown more particularly in Fig. 5 of the drawing. It will be seen that the sprocket 68 is mounted on a sleeve 73 which has a threaded end 74. The sleeve also has a collar 76 at its opposite end. Discs of friction material 77 are placed on either side of the sprocket. The threaded portion is provided with a nut 78 which presses a flexible steel washer 79 against a steel washer 81 bearing against the discs of friction material. The sleeve 73 is keyed to the shaft 71. The assembly of parts just described provides a friction drive from gear box 64 to shaft 71.

Also mounted on the shaft 71 are sprockets 82 and 83.

Passing over the sprocket 82 is a length of chain 84 and passing over the sprocket 83 is a length of chain 86. In longitudinal alignment with the sprockets 82 and 83 are idler sprockets 87 and 88, located at the opposite end of the framework. A length of chain 89 passes over the sprocket 87 and a length of chain 91 passes over the sprocket 88.

One end of the several lengths of chain just mentioned are operatively connected through short, threaded rods 92 to angle brackets 93 which depend from the sides of the assemblies 34. See Fig. 2a. Connected to the other ends of the lengths of chains are longer rods 94. As best shown in Figs. 1 and 2 of the drawings the rods cross and are connected as at 96 to the assemblies 34.

From what has just been described it will be apparent that rotation of shaft 71 in one direction has the ultimate effect of moving the chain guide and saw assemblies toward each other, while rotation of shaft 71 in the opposite direction moves the chain guide and saw assemblies away from each other. Likewise, due to the sliding arrangement of the pulleys 59 and the sliding arrangement for the chain sprocket 38 it will be seen that the saw arbors are rotated and that the chain guides are driven in a direction to feed the boards to the saws.

The control means and associated mechanism for automatically positioning the saws the correct distance apart in response to the setting of a single manual switch will now be described. The major portion of the controls may be housed in a control box indicated generally at 97 and which preferably is located at one end of the shaft 71. As best shown in Figs. 4, 6, 7 and 8, it will be seen that on the end of shaft 71 we provide an epicyclic gear train which consists of a pinion 98 mounted non-rotatably on the outer face of a bushing 99 which surrounds a reduced portion 101 of shaft 71. Secured in suitable manner to a reduced portion 102 of shaft 71 is an arm 103. The arm 103 carries a cross pin 104. Mounted non-rotatably on the pin 104 in mesh with the pinion 98 is a gear 106. Also mounted non-rotatably on the pin 104 is a gear 107. The gear 107 is in mesh with a pinion 108 which in turn is fast on a shaft 109 supported in a suitable bearing 110. The variation in number of teeth of the gears preferably is such that shaft 109 rotates approximately $\frac{1}{20}$ of a revolution for each revolution of shaft 71. Thus, gear 98 may have 34 teeth, gear 106 may have 36 teeth, gear 107 may have 37 teeth, and gear 108 may have 35 teeth.

Keyed to the shaft 109 is a contact plate or disc 111 of electrically non-conducting material. Mounted in the case 97, closely adjacent one face of the disc 111 is a fixed selector disc 112, also of electrically non-conducting material.

On the face of the disc 111 opposite disc 112 we provide two concentric collector rings 113 and 114 of conducting material. On the face of the disc 111 which is to be adjacent the disc 112 we mount separate, segmental collector rings 116 and 117 of conducting material. By means of a suitable connection 118 the innermost ring 113 is electrically connected to the segment 116. A similar connection 119 electrically connects the ring 114 with the segment 117.

Mounted on a wall 121 of the housing 97, and suitably insulated therefrom are screw posts 122 and 123. Each screw post has a clip 124 which, through rod-like bushes 126 is capable of making slidable electric contact, in the manner later to appear, with the collector rings 113 and 114.

The selector disc 112 carries thereon a plurality of wire connecting screws 130, there being one of these for each setting of the saws. In the instance shown, there are eight of the screws 130 for setting the saws at two foot spacings from 6 to 20 feet, inclusive. Each of the screws 130 is provided with a contactor clip 127, which, through the medium of a rod-like brush 128 makes sliding contact with the segments 116 and 117 in the manner to appear.

As shown in Fig. 10 the selector switch 129 comprises a manually rotatable selector button 131 which has a pointer 132 thereon. The dial 133 is laid off to indicate spacings of the saws from 6 to 20 feet, inclusive, as shown. This switch 129 may be connected to the rest of the apparatus by relatively long cable 134 (sheet 2) so that the operator of the machine may stand alongside the apparatus with the switch 129 in his hand. As shown in Fig. 11, there is a contact arm 129a connected fixedly to the button 131. The arm 129a as rotated by the button 131 makes contact with the leads 161, thereby selectively connecting the leads 161 with the common current supply lead 176.

In order to assure that the chain guide and saw assemblies stop at precisely the required settings we provide the mechanism now to be described. On the shaft 71, preferably just ahead of the reduced section 101 thereof we mount a collar indicated generally at 136. See particularly Fig. 9. The collar is keyed to the shaft 71 by a key 137. The collar is provided with shoulders 138, diametrically spaced. Pivotally mounted on pins 139 and 141 are locking dogs 142 and 143 having ends 144 and 146 which are disposed to engage as shown in Fig. 9 under the shoulders 138. A spring 147 pulls the locking dogs inwardly to the full line position shown in Fig. 9, that is, to locking position.

Mounted in a portion 148 of the housing 97 is a solenoid 149. The armature 151 of the solenoid has a plate 152 on the supper end thereof which is adapted, when the solenoid is energized, to move upwardly, engaging the lower ends 153 and 154 of the dogs. This movement pivots the dogs to the dotted line position shown in Fig. 9, releasing shaft 71 for rotation. The solenoid 149 is in circuit with the remainder of the controls so that it functions to release the shaft 71 automatically. However, as the shaft rotates it will be apparent that the dogs 142 and 143 serve to stop the same at a precise point in its rotation, once during each revolution thereof.

Referring now more particularly to Fig. 11 of the drawings the wiring diagram will now be explained. As stated, the switch 129 has a position for each length of board to be cut. Therefore, the leads 161 from the switch 129 are connected to the screws 130 on the selector disc 112. Connected to the screws 122 and 123 are leads 162 and 163, respectively. The lead 162 is connected to the coil 164 of an electro-magnetic switch. The wire 163 is connected to the coil 166 of a similar magnetic switch.

The switch 164 controls contact arms 167 and 168, both of which contact arms are connected to the current supply lines 169 and 171 whenever a double pole, single throw switch 172 is closed. The other sides of the coils of the magnetic switches are connected by lines 173 and 174 to the power supply line 171. A line 176 connects the movable contact finger 129a of the switch 129 to the line 169. The coil 166 controls switch arms 177 and 178 which are connected respectively to the power supply lines 169 and 171.

The stationary contact 179 is connected by a line 181 to the stationary contact 182. In similar manner the stationary contact 183 is connected by a line 184 and a branch line 186 to a stationary contact 187. The lines 181 and 184—186 are connected respectively by lines 188 and 189 to the motor 63. The solenoid 149 is connected by lines 191 and 192 to the lines 188 and 189 as shown.

From the foregoing the method of constructing and using our improved lumber trimmer may now be explained and readily understood. It will be understood, from what has been said, that the motor 63 is a reversible motor. Further, from an inspection of the wiring diagram, Fig. 11, it will be apparent that the relay switches 164 and 166 constitute, in effect, reversing circuits for causing the motor to run first in one direction and then in the other since the lines 169 and 171 are connected in alternate manner to the terminals of the motor 63, depending upon which of the relays 164 or 166 is closed.

With the apparatus constructed as shown the drive from the motor to the cross shaft 71 is such that one revolution of the shaft 71 in either direction moves the saws exactly two feet apart, namely, moves each of the chain guide and saw assemblies precisely one foot, either toward each other or from each other as will appear. The lumber is fed onto the apparatus where it is engaged by the dogs 44 of the chains 43 and is drawn thereby evenly, in alignment, into the two saws 53.

With particular reference to the wiring diagram it will be seen that when the knob 131 of switch 129 is turned to close a circuit between line 176 and the selected line 161, a circuit is established either to coil 164 or 166, depending upon which position is selected by the switch 129. For instance, in Fig. 11 it will be seen that the 14 foot setting is the one which has last been selected, in response to a former closing of the 14 foot setting of the contacts of switch 129. Let it be assumed that it is desired now to set the machine to cut a 6 foot board. The selector switch 129 is turned until the 6 foot position is reached. Thereupon, a circuit is established from the power line 169, line 176, the 6 foot contact of switch 129, to disc segment 116. As clearly shown in Fig. 4 of the drawing the wire 163, which is connected to the screw 123 is effectively connected to segment 116 through the clip 124, its associated brush 126, ring 113, and jumper wire 118. It will further be understood that the wires 161 are connected to the screws 130, one for each station or position indicated on the switch 129. Closing the 6 foot position of switch 129 energizes relay 166, closing the contact arms 177 and 178 against the stationary contacts 187 and 182, respectively. This energizes solenoid 149, causing its armature 151 to move the plate 152 upwardly, releasing the dogs 142 and 143. Substantially simultaneously motor 63 is energized in a direction to connect the power supply line 169 to the terminal of the motor to which the line 189 is connected. Likewise, power supply line 171 is connected to the line 188 through the line 194 as shown. The motor 63 rotates the shaft 71 and the associated parts until the 6 foot contact brush 128 runs off the end of the disc segment 116. The parts are so built that the shaft 71 "coasts" slightly after the brush 128 has run off the segment 116 whereupon the dogs 142 and 143, under the influence of spring 147, engage the shoulders 138 of the collar 136, stopping the chain guide and saw assemblies at precisely the 6 foot setting for the saws. Again starting with the parts in the position of Fig. 11 had the 20 foot setting of switch 129 been closed, the lines 169 and 171 would have been connected to opposite terminals of the motor 63 through the closing of relay switch 164, thus running the motor in the opposite direction. The parts would then have come to rest with the line 161 for the 20 foot setting disconnected from the segments, or, namely, occupying the position that the brush for the 14 foot setting occupies as shown in Fig. 11. Therefore, regardless of the intial position of the mechanism, motor 63 and the associated control mechanism moves the saw supporting unit to the selected position, whether the saws must move toward or from each other.

It will further be noted that by mounting the saws 53 on arbors journalled on the frames of the chain guide assemblies we are enabled readily to change the saws. Furthermore, due to the set screw arrangement for the arbor supporting bearings we are enabled to adjust the angularity of the longitudinal axis of the arbor 52 thereby to provide the amount of toe-in, that may be necessary or desired for proper operation of the saws. Further, by driving the saws through the V-belt final drive we eliminate the shocks imposed on the saw which are present if they are mounted directly on the shaft 22 as heretofore has been the case. Again, it will be noted that we eliminate the whipping action of the long unsupported shaft 22 which would be present if the saws were mounted slidably thereon as in present practice.

In actual operation our improved apparatus has been found to be extremely practical and very accurate. It will be understood that the torque limiting drive 69 permits the dog elements 142 and 143 to engage the collar 136 just prior to the time that the motor and gear box drive comes to a complete stand still. Therefore, through the medium of such a slip or friction type drive we assure positive stopping of the shaft 71 at precisely one complete revolution. It will be understood again, that the necessary ratios between the various sprockets and drives is such as to effect a total of two feet difference in spacing of the saws with each revolution of shaft 71.

While we have shown our invention in but one form, it will be obvious to those skilled in the art that it is not so limited but is susceptible of various changes and modifications without departing from the spirit thereof, and we desire, therefore, that only such limitations shall be placed thereupon as are specifically set forth in the appended claims.

What we claim is:

1. In a lumber trimmer, a frame, a pair of chain guide and saw assemblies mounted on the frame for movement toward and from each other, means to move said assemblies toward and from each other in predetermined increments, a driven splined power shaft journalled in the frame and extending generally parallel to the direction of movement of the assemblies, pulleys keyed to and slidable along the shaft, a saw arbor on each assembly, a vertically disposed saw on each arbor, a pulley on each arbor, a belt passing over the pulleys on the arbors and over the said slidable pulleys whereby both saws are driven by said power shaft, a second splined shaft journalled in the frame generally parallel to the first named shaft, sprockets keyed to and slidable along the second shaft, idler sprockets on the assemblies, a lumber feed chain passing over each keyed sprocket and over one of said idler sprockets, and means to rotate the second splined shaft from the first named splined shaft.

2. For use in lumber trimming apparatus, a chain guide and saw assembly comprising an elongated frame, a lumber feed chain supported on the frame for movement in a direction to feed lumber over the assembly, a saw arbor mounted in suitable bearings on the assembly, an elongated power shaft relative to which the assembly is axially slidable, and a belt pulley on the saw arbor to which power may be supplied from the power shaft to rotate the saw.

3. Apparatus as defined in claim 2 in which the arbor is adjustably mounted on the assembly frame, and in which there is means for adjusting the angularity of the arbor relative to the frame of the assembly, thereby to vary the toe-in of the saw relative to lumber fed thereto by said feed chain.

References Cited in the file of this patent

UNITED STATES PATENTS

| | | |
|---|---|---|
| 235,824 | Story | Dec. 21, 1880 |
| 369,026 | Parish | Aug. 30, 1887 |
| 497,768 | Cole | May 23, 1893 |
| 1,180,842 | Goetz | Apr. 25, 1916 |
| 1,654,435 | Sergeant | Dec. 27, 1927 |
| 1,761,096 | Tower | June 3, 1930 |
| 1,911,021 | Gunther et al. | May 23, 1933 |
| 2,505,262 | Torcheux | Apr. 25, 1950 |
| 2,517,155 | Yardeny | Aug. 1, 1950 |